United States Patent [19]
Komori et al.

[11] Patent Number: 4,905,580
[45] Date of Patent: Mar. 6, 1990

[54] GRILLES FOR AIR CONDITIONING

[75] Inventors: Takahiro Komori; Kazuo Fujihara, both of Inazawa, Japan

[73] Assignee: Toyoda Gosei Co., Ltd., Nishikasugai, Japan

[21] Appl. No.: 258,313

[22] Filed: Oct. 14, 1988

[30] Foreign Application Priority Data

| Oct. 20, 1987 | [JP] | Japan | 62-161210[U] |
| Oct. 20, 1987 | [JP] | Japan | 62-161211[U] |
| Oct. 20, 1987 | [JP] | Japan | 62-161212[U] |
| Feb. 12, 1988 | [JP] | Japan | 63-17914[U] |
| Feb. 12, 1988 | [JP] | Japan | 63-17915[U] |
| Feb. 13, 1988 | [JP] | Japan | 63-17812[U] |
| Apr. 28, 1988 | [JP] | Japan | 63-57622[U] |
| Apr. 28, 1988 | [JP] | Japan | 63-57623[U] |
| May 20, 1988 | [JP] | Japan | 63-67014[U] |

[51] Int. Cl.$^4$ .............................................. B60H 1/34
[52] U.S. Cl. ........................................ 98/2; 98/40.24; 98/40.27
[58] Field of Search ............... 98/2, 40.24, 40.26, 98/40.27, 40.28, 121.2

[56] References Cited

U.S. PATENT DOCUMENTS

| 2,735,351 | 2/1956 | Abrahamsen | 98/40.26 |
| 3,177,797 | 4/1965 | Kennedy | 98/40.24 |
| 4,665,804 | 5/1987 | Miyasaka | 98/40.27 X |

FOREIGN PATENT DOCUMENTS

| 51-2849 | 1/1976 | Japan . |
| 51-6643 | 1/1976 | Japan . |
| 194160 | 8/1987 | Japan | 98/40.27 |

Primary Examiner—Joyce Harold
Attorney, Agent, or Firm—Cushman, Darby & Cushman

[57] ABSTRACT

A grille for air conditioning provided in an automobile and others comprising: a main body case having an opening for blowing out the wind, a plurality of curvable wind direction adjusting plates having one side and the other side extending in the substantially intersecting direction with the flow direction of the wind, the one side being supported on the main body case, a support member which supports the other side of the wind direction adjusting plate, and moving members for moving the support members on an arc locus relatively in parallel to the main body case, and the arc having a shorter radius of curvature than a span between the two sides of the wind direction adjusting plate in a free state.

15 Claims, 5 Drawing Sheets

GRILLES FOR AIR CONDITIONING

BACKGROUND OF THE INVENTION

1. Field of the Invention

The present invention relates to grilles for air conditioning provided in automobiles and others.

2. Description of the Related Art

The following grille for air conditioning provided mainly on the instrument panel of an automobile is publicly known, which is disclosed in the Japanese Utility Model Laid-open No. 51-2849. Namely, the wind direction adjusting plates made of leaf springs are fitted in a case being deformed in a shape of an arc. Said wind direction adjusting plates are given pressure by an operation lever, thereby the direction of an arc is changed to the right or the left, enabling the direction of the wind to be changed.

Figure 13:
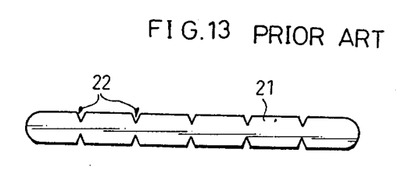
FIG. 13 is a side view showing a conventional wind direction adjusting plate.

As an example of this type of the wind direction adjusting plate, there is disclosed in the Japanese Utility Model Laid-open No. 51-6643 a wind direction adjusting plate with V-shaped slits formed at equal intervals as shown in FIG. 13 on the upper and the lower surfaces to make easily curved.

In the above described type of the grille for air conditioning, however, a considerable amount of operation force was needed to change the direction of the wind by curving the wind direction adjusting plate by means of the operation lever because of the position of the operation lever and the resiliency of the wind direction adjusting plate. Moreover, when the wind direction adjusting plate was curved, the plate was apt to be disadvantageously twisted or distorted because of its free curvability.

Also, there was a problem that the strength and the rigidity of each member of the grille must be reinforced or the precision of bearings be enhanced in order to solve the above problems, resulting in the increasing weight and cost of the whole of the grille for air conditioning.

Also, there was a problem in the conventional type of the grille for air conditioning that the structure was complicated and nevertheless, the arc of the wind direction adjusting plate was not smooth. Moreover, the end portion of the wind direction adjusting plate at the wind leading-in side is not aligned in the same direction as the wind led in, resulting in occurrence of a noise when sending especially a strong wind.

There was a problem that since the force from the operation lever to change the direction of the wind is not transmitted uniformly to the whole of the wind direction adjusting plate, the wind direction adjusting plate is twisted, thereby the flow of the wind is disordered and swirled, resulting in occurrence of a noise and the unfavorable direction of the wind. The above-described wind direction adjusting plate 21 shaped as shown in FIG. 13 had a problem that the flow of the wind was disordered owing to the concavities and the convexities of the slits 22, resulting in occurrence of a noise and the unfavorable direction of the wind.

Also, there was a problem that since the force from the operation lever to change the direction of the wind was not transmitted uniformly to the whole of the wind direction adjusting plate, the plate was twisted, the flow of the wind was disordered and swirled, resulting in occurrence of a noise and unfavorable direction of the wind, as described in the above.

Further, in order to change the direction of the wind, the operation force to cause resilient deformation to the wind direction adjustment plate is needed in addition to the frictional force of the bearings and others of the wind direction adjusting plate. Accordingly, there was a problem that the operation force became heavy in cooperation with the increasing degree of the curvature of the wind direction adjusting plate.

Further, there was a problem that when the wind direction adjusting plate was largely curved by the operation lever, the curved state of the wind direction adjusting plate was restored to the original state due to a small frictional force of the bearings and others of the wind direction adjusting plate.

BRIEF DESCRIPTION OF THE DRAWINGS

FIGS. 1 to 3 show a first embodiment of the present invention.

FIGS. 4 and 5 show a second embodiment of the present invention.

FIG. 7 and FIG. 8 show a modification of the third embodiment.

FIGS. 9 and 10 show a fourth embodiment.

FIGS. 11 and 12 show a modification of a fourth embodiment.

FIGS. 14 and 15 show a fifth embodiment.

FIGS. 16 and 17 show a sixth embodiment.

FIGS. 18 to 21 show a seventh embodiment.

SUMMARY OF THE INVENTION

It is an object of the present invention to provide a grille for air conditioning which is operable with a light operation force, free from being twisted or distorted when a wind direction adjusting plate is curved and more than that, the increase of the weight is small and the manufacturing cost is low.

It is another object of the present invention to provide a grille for air conditioning which the structure is simple, the arc of the wind direction adjusting plate is smooth and especially the generation of a noise is suppressed when the strong wind is sent in.

It is a further object of the present invention to provide a grille for air conditioning which is the direction of the wind blown out is as desired, the operation force by an operation member is light and the curved state of the wind direction adjusting plate is maintained as desired.

In order to obtain the foregoing objects, the present invention is constituted with a main body case having an opening for blowing out the wind, a plurality of curvable wind direction adjusting plates having one side and the other side extending in the substantially intersecting direction with the flow direction of the wind and with said one side being supported on said main body case, supporting members which support said the other side of said wind direction adjusting plate and moving means which move said supporting means relatively and parallel to the main body case on the locus of an arc which has a shorter radius of curvature than the span between said two sides of the wind direction adjusting plate in the free state.

Other objectives of the present invention will become apparent with an understanding of the embodiments described later, and as clarified in the appended claims. Further, many advantages not mentioned in this specification will remind those skilled in the art if the present invention is put into practice.

DETAILED DESCRIPTION OF THE PREFERRED EMBODIMENTS

[First Embodiment]

A first embodiment embodying the present invention in a grille for air conditioning provided on an instrument panel of an automobile will be explained with reference to FIGS. 1 to 3.

Figure 3:
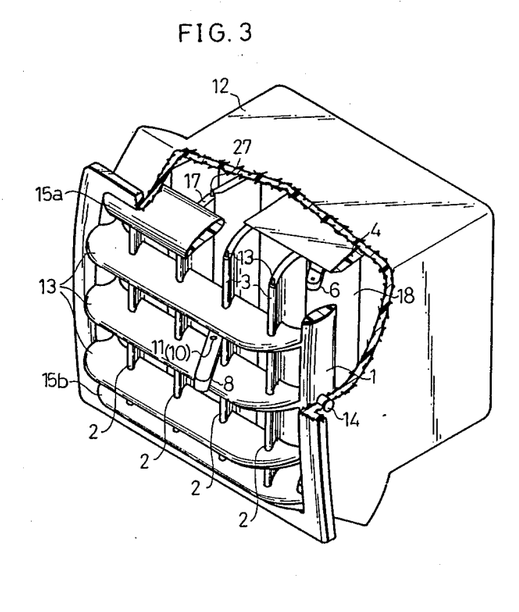
FIG. 3 is a perspective view showing a grille for air conditioning.

As shown in FIG. 3, a main body case 1 having three wind direction adjusting plates 13 made of non-curvable and rigid resin are disposed in the horizontal direction at the front portion of a wind blowing duct 12 of a rectangular parallelpiped shape with openings at the front and rear sides. The main body case 1 is rotatably supported to the wind blowing duct 12 by means of a shaft 14.

Figure 1:
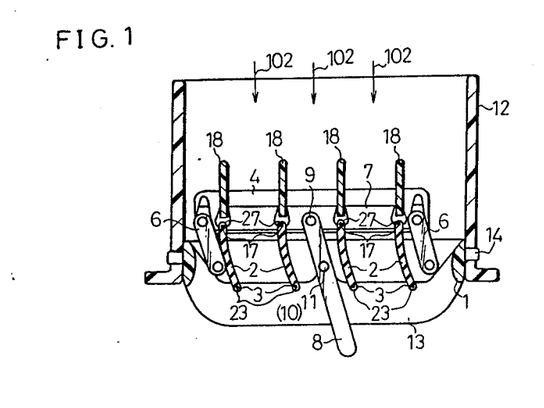
FIG. 1 is a transverse sectional view showing a grille for air conditioning.

At the rear portion of said wind direction adjusting plates 13, namely the up-stream side of a wind 102, as shown in FIG. 1, four another curvable wind direction adjusting plates 2 are disposed at substantially equal intervals in the vertical direction intersecting said wind direction adjusting plates 13. The front end of said wind direction adjusting plates 2, namely an one side 3 of the down-stream side of the wind 102 is supported by a shaft 23 fixed between said wind direction adjusting plate 2 and retaining plates 15a, 15b of a flat plate shape which are integrally disposed up and down in said main body case 1.

For the material of said curvable wind direction adjusting plate 2, rubber such as chroloprene rubber and others, synthetic resin such as polyvinylchloride, polypropylene, polyethylene and others and metal such as stainless and others are used.

Accordingly, said shafts 23 are reinforced respectively at four positions by said retaining plates 15a, 15b and said wind direction adjusting plates 2, thereby the curvature of the wind direction adjusting plates 2 are securely performed. The rear end portions, namely the other sides 17 at the up-stream side of the wind 102, are fixed to shafts 27 provided on coupling plates 4 as supporting members which couple said wind direction adjusting plates 2 at the upper and the lower positions.

On the rear extention line of said four wind direction adjusting plates 2, another wind direction adjusting plates 18 made of non-curvable and rigid resin and functioning as support members are disposed integrally with the upper and the lower coupling plates 4. The front end portion of said wind direction adjusting plate 18 is fixed to said shaft 27 and adapted to be always in the same direction as the direction of the wind coming from the rear of said wind blowing duct 12. Said wind direction adjusting plates 18 are supported by the four shafts 27 which are reinforced respectively by the wind direction adjusting plates 18, thereby the curvature of the wind direction adjusting plates 2 situated at the front is not obstructed.

Figure 2:
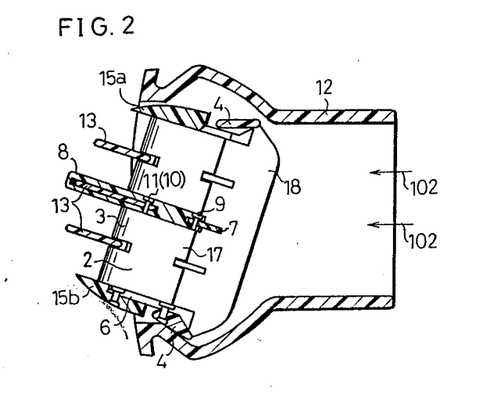
FIG. 2 is a longitudinal sectional view showing a grille for air conditioning.

As shown in FIGS. 1 and 2, cross-linking members 7 which couple four wind direction adjusting plates 2 as support members are provided in the transverse direction at almost the central portion longitudinally of the other side 17 of said wind direction adjusting plate 2. At almost the central portion of said cross-linking member 7, an operation lever 8 is provided as an operation member to act with the rear end supported rotatably as a point of application 9 with the middle portion supported by a shaft 10 fixed to the main body case 1 as a fulcrum 11. Said operation lever 8 is formed so as to hold said wind direction adjusting plate 13 from the upper and the lower to generate a frictional force. Thereby, the curved state of the wind direction adjusting plate 2 is maintained in opposition to the restoring force of resiliency of said wind direction adjusting plate 2.

The radius of curvature at the natural length between the point of application 9 and the fulcrum 11 of said operation lever 8 is shorter than the span of curvature at the natural length between the two sides 3, 17 of the wind direction adjusting plate 2. Accordingly, as the coupling plate 4 moves, the straight line between the two sides 3 and 17 of the wind direction adjusting plate 2 becomes gradually shorter while the degree of curvature of the wind direction adjusting plate 2 becomes large. In this case, the ratio of said radius of curvature to the span is preferably 0.65–0.85 to 1 and optimally 0.75 to 1 and thereabout.

At the both upper and lower ends of said coupling plate 4, a pair of rods 6 as a moving means are provided with one end rotatably supported by said coupling plate 4 and with the other end rotatably supported on the main body case 1, thereby constituting a parallel link with said pair of rods 6, said coupling plate 4 and said wind direction adjusting plate 13.

When said operation lever 8 is rotated laterally from the front of the main body case 1, said operation lever 8 rotates laterally centering around the fulcrum 11 while the coupling plate 4 which is coupled at the point of application 9 moves in the reverse direction. Thereby, the wind direction adjusting plate 2 is adapted to curve between the front and the rear shafts 23, 27. In this case, the side end of the shaft 27 of the wind direction adjusting plate 2 is adapted to be in the same direction as the one of the wind 102 blown from the rear of the wind blowing duct 12.

The wind direction adjusting plates 2, 13, 18, the coupling plate 4, the crosslinking member 7, the retaining plates 15a, 15b and others are constituted as a unit with the main body case 1 and the unit is rotated integrally and centering around the shaft 14.

The operation of the grille for air conditioning constituted as described above is explained and its effects are mentioned.

First, as shown in FIG. 1, when the operation lever 8 is moved from the center to the right and to the predetermined position, the operation lever 8 rotates centering around the fulcrum 11, thereby the crosslinking member 7 which is coupled with the rear end of the operation lever 8 at the point of application 9 moves to the left. And the wind direction adjusting plate 2 curves projectingly to the right with the shaft 27 of the coupling plate 4 as one fulcrum and with the shaft 23 as the other fulcrum.

Also the wind direction adjusting plate 18 situated at the rear of the wind direction adjusting plate 2 retains the lengthwise direction. Accordingly, the wind 102 from the rear of the wind blowing duct 12 flows smoothly to the right along the curved wind direction adjusting plate 2 through the wind direction adjusting plate 18.

When the main body case 1 is rotated upwardly centering around the shaft 14, the wind direction adjusting plate 2, 13, 18 and others as a unit is rotated upwardly at the same time with it. Accordingly, the wind 102 from the wind direction adjusting plate 2 situated at the rear flows upwardly along the wind direction adjusting plate 13.

When said operation lever 8 is moved to the left contrary to the above, the coupling plate 4 moves to the right and the wind direction adjusting plate 2 curves projectingly to the right. The wind direction adjusting plate 18 retains the lengthwise direction. Therefore, the wind 102 from the rear of the wind blowing duct 12 flows to the left along the wind direction adjusting plate 2 through the wind direction adjusting plate 18.

As described in the above, the grille for air conditioning in the present embodiment enables the operation lever 8 to be operated with a comparatively light force, since the point of application 9 of the operation lever 8 is positioned at almost the center of the crosslinking member 7 and the operation force of the operation lever 8 is transferred to uniformly to the rear end portion of the four wind direction adjusting plates 2 and to the coupling plate 4. Moreover, the wind direction adjusting plate 2 is curved continuously and smoothly and twist or distortion is not caused, since the uniform force is securely transferred to the shaft 27 at the rear end portion of the wind direction adjusting plate 2. Since only the crosslinking member 7 and others are provided, the weight increase of the grille for air conditioning is small and the manufacturing cost is also small.

As described in the above, when the ratio of the radius of curvature of the operation lever 8 to the span of the wind direction adjusting plate 2 is set at about 0.75 to 1, the other side 17 of the wind direction adjusting plate 2 is always in the same direction as the one of the wind 102 from the rear of the wind blowing duct 12 and the other side 17 does not effect the rotational force on the shaft 27. Accordingly, it is possible to fix said other side 17 to the shaft 27. Therefore, the ratio of said radius of curvature to said span is optimally about 0.75 to 1.

Also, since the wind direction adjusting plate 18 and the end portion of the wind direction adjusting plate 2 facing the wind 102 intake side is in the same direction with the one of the wind 102 led in from the wind blowing duct 12, generation of a noise is reduced.

Moreover, since it is possible to blow out the wind 102 longitudinally as desired by operating the operation lever 8 longitudinally and blow out the wind 102 vertically as desired by rotating the main body case 1 vertically, it is easily possible to blow out the wind 102 in any direction as desired, longitudinally or vertically.

[Second Embodiment]

Another embodiment embodying the present invention in a grille for air conditioning provided on the instrument panel of an automobile will be explained hereafter with reference to FIG. 4 and FIG. 5.

Figure 4:
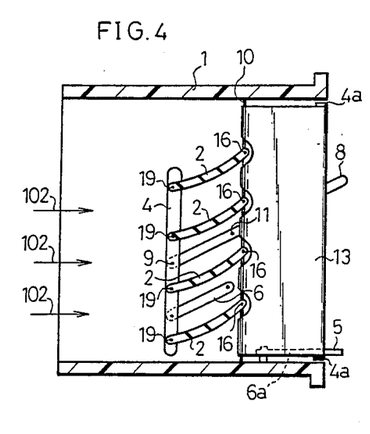
FIG. 4 is a longitudinal sectional view showing a wind direction adjusting plate.
Figure 5:
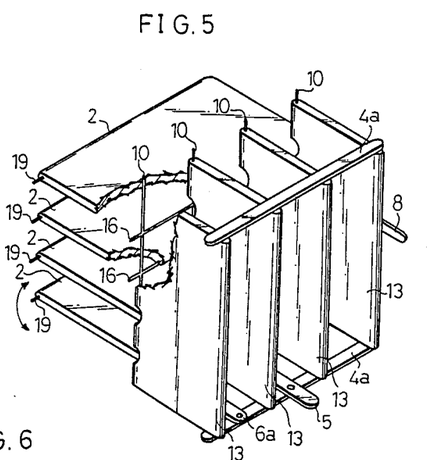
FIG. 5 is a perspective view showing an internal structure of a wind direction adjusting plate.

As shown in FIG. 4 and FIG. 5, the four pieces of curvable wind direction adjusting plates 13 are disposed vertically and at substantially equal intervals at the front portion of a main body case 1 of a rectangular parallelpiped shape with the openings at the front and at the rear. As a material of said curvable wind direction adjusting plate 13, the one used in the above described 1st embodiment is used. Said wind direction adjusting plate 13 may be made of a material of being non-curvable and rigid.

Coupling plates 4 are provided at the upper and the lower front ends of said wind direction adjusting plates 13 so as to couple said four pieces of wind direction adjusting plates 13 rotatably. At the rear ends of each wind direction adjusting plate 13, shafts 10 are provided with the upper and the lower portions being fixed to said main body case 1, to which the rear ends of each wind direction adjusting plate 13 are fixed. At the substantially central position of the front and the lower portion of said main body case 1, an operation lever 5 is provided, the front portion of which is rotatably supported by one of the coupling plates 4a disposed at the lower portion while the rear portion of the operation lever 5 is fixed to said main body case 1. Also, a rod 6 is provided parallel to said operation lever 5, the front end of which is rotatably supported by said coupling plate 4a while the rear end is fixed to said main body case 1. When said operation lever 5 is rotated in the lateral direction, the coupling plate 4a is accordingly rotated in the lateral direction and the four pieces of wind direction adjusting plates 13 are adapted to be curved between the shafts 10 and the coupling plates 4a.

At the rear portion of said wind direction adjusting plates 13, four pieces of shafts 16 are provided intersecting said shafts 10, being fixed to the both sides of the main body case 1 and fixed to the shafts 10. At the rear portion, four pieces of wind direction adjusting plates 2 are laterally disposed, the front ends of which are supported by said shafts 16 and curvable. The rear end portions of said 4 wind direction adjusting plates 2 are fixed to shafts 19 of the coupling plates 4 so as to rotate as a unit. At substantially the central portion of said coupling plates 4, an operation lever 8 is provided, one end of which is supported by said coupling plate 4 at a point of application 9 and which a fulcrum 11 at the middle portion is fixed to the main body case 1. At the lower portion of said operation lever 8, a rod 6 is provided, one end of which is rotatably supported by the main body case 1 while the other end of which rotatably supported by a coupling plate 7, thereby constituting a parallel link with said operation lever 8. When said operation lever 8 is rotated in the vertical direction, the operation lever 8 rotates centering around the fulcrum 11, the rod 6 rotates centering around a shaft fixed to the main body case 1 and they move parallel with each other, thereby the coupling plate 4 moves vertically and the wind direction adjusting plates 2 are curved between said shafts 19 and 16.

The ratio of the radius of curvature in the natural length between the points 9 and 11 of the operation lever 8 to the span in the natural length between the two shafts 16 and 19 of the wind direction adjusting plates 2 is preferably 0.65-0.85 to 1, optimally about 0.75 to 1.

The operation of the grille for air conditioning thus constituted is explained and its effects are mentioned.

First, as shown in FIG. 4, when the operation lever 8 is moved upwardly to the predetermined position, the operation lever 8 rotates centering around the fulcrum 11, thereby the coupling plate 4 which the rear end portion of said operation lever 8 is coupled with at the point of application 9 rotates downwardly. At this time, the wind direction adjusting plate 2 curves projectingly downward with the shaft 19 fixed to the coupling plate 4 as one fulcrum and with the shaft 16 as the other fulcrum. Accordingly, the wind 102 from the rear of the main body case 1 flows smoothly upwards along the wind direction adjusting plate 2.

When the operation lever 5 is moved in the right direction, the coupling plate 4a which is rotatably supported by said operation lever 5 also moved in the same direction. The front end portion of the wind direction adjusting plate 13 positioned at the front portion in the main body case 1 moves in the same right direction, since being coupled with said coupling plate 4a. Also, the wind direction adjusting plate 13 curves projectingly toward the left direction between the coupling plate 4a and the shaft 10, since the rear end portion of the wind direction adjusting plate 13 is fixed to the shaft 10.

Accordingly, the wind 102 from said wind direction adjusting plate 2 positioned at the rear of the main body case 1 flows along the wind direction adjusting plate 13 in the right direction. The wind 102 blown out of the front portion of the main body case 1 flows upwardly and in the right direction.

On the contrary to the above, when the operation lever 8 is moved downwardly, the coupling plate 4 rotates upwards and the wind direction adjusting plate 2 curves projectingly upwards. Accordingly, the wind 102 from the rear of the main body case 1 flows downward along the wind direction adjusting plate 2.

Moreover, when the operation lever 5 is moved in the left direction contrary to the above case, the coupling plate 4a also moves in the left direction and the wind direction adjusting plate 13 curves projectingly toward the right direction. Accordingly, the wind 102 from the wind direction adjusting plate 2 flows toward the left direction. Therefore, the wind 102 blown out of the front portion of the main body case 1 flows downwards and in the left direction.

As mentioned in the above, the grille for air conditioning according to the present embodiment does not need to dispose the wind direction adjusting plate which is previously curved as carried out in the conventional manner. Also it does not need to provide a pin to regulate the position near the central portion of the wind direction adjusting plate, resulting in simple construction.

Also, the wind direction adjusting plate 2 is curved continuously and smoothly by the parallel link constituted by the operation lever 8 and the rod 6 as well as the end portion of the wind direction adjusting plate 2 at the wind intake side is in the same direction as the one of the wind 102 led in. Further, the wind direction adjusting plate 13 is continuously by the operation lever 5 and the rod 6a. Accordingly, a noise is hardly generated, especially when the strong wind is sent in.

Moreover, since the shaft 10 of the wind direction adjusting plate 13 positioned at the front portion in the main body case 1 and the shaft 16 of the wind direction adjusting plate 2 positioned at the rear portion are securely coupled, the depth size can be shortened as well as the supporting strength and rigidity are improved, thereby no twist nor distortion of the wind direction adjusting plates 2 and 13 are generated.

As described in the above, when the ratio of the radius of curvature of the operation lever 8 to the span of the wind direction adjusting plate 2 is always in the same direction as the one of the wind 102 from the rear portion of the wind blowing duct 12, therefore the other side 17 does not effect a rotational force on the shaft 27, to which the other side 17 can be fixed. Accordingly, the ratio of said radius of curvature to the span is optimally 0.75 to 1.

[Third Embodiment]

An other embodiment embodying the present invention in a grille for air conditioning provided on the instrument panel of an automobile will be explained hereafter with reference to FIG. 6.

Figure 6:
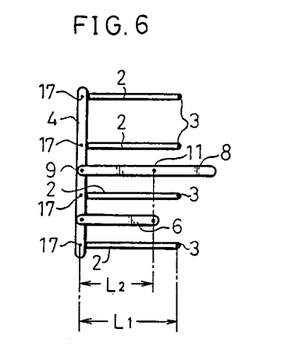
FIG. 6 is a side view showing a third embodiment of the present invention.

A grille for air conditioning according to the present embodiment, as shown in FIG. 6, has four pieces of curvable wind direction adjusting plates 2 disposed at equal intervals vertically in a main body case 1 of a rectangular parallelpiped shape and with openings at the front and the rear. One end of said each wind direction adjusting plate 2 is rotatably fixed to the main body case 1 at a little rear position from the front end portion in the main body case 1, which is one side 3 of each wind direction adjusting plate 2. As a material of each wind direction adjusting plate 2, the materials exemplified in the first embodiment are used.

At the other end of the wind direction adjusting plate 2, a coupling plate 4 is provided in the vertical direction, to which four pieces of wind direction adjusting plates 2 are fixed at equal intervals. And the portion which each wind direction adjusting plate 2 is fixed to is the other side 17 of the wind direction adjusting plate 2. Instead of fixing the wind direction adjusting plate 2 to the coupling plate 4 at the other side 17, it may be supported rotatably.

When said coupling plate 4 is at the position shown in FIG. 6 and the wind direction adjusting plate 2 is level, the wind direction adjusting plate 2 has a natural length. In this case, a straight line between the two sides 3 and 17 is adapted to be the longest. Moreover, at the side end portion of the other side 17 of the wind direction adjusting plate 2, it is adapted to be in the same direction as the one of the wind 102 (horizontal direction) led in from the rear of the main body case 1 without regarding to the upper or lower position of the coupling plate 4.

As said coupling plate 4 is moved upwardly, the straight line between the two sides 3 and 17 of the wind direction adjusting plate 2 is gradually reduced. The wind direction adjusting plate 2 is curved upwardly and the wind 102 from the rear portion of the main body case 1 strikes against the wind direction adjusting plate 2, then blows out downwardly along the curved portion.

At the horizontally left end portion in the main body case 1, an operation lever 18 is rotatably supported at a fulcrum 9, one end of which is positioned at the central position of said coupling plate 4. The other end is rotatably supported at the behind position of one side 3 of the wind direction adjusting plate 2 and FIG. 6 where the wind direction adjusting plate 2 is level and has a natural length at the fulcrum 11 where, the ratio of the radius of curvature L2 between the two points 9 and 11 of the operation lever 8 to the span L1 between the two sides 3 and 17 of the wind direction adjusting plate 2 is 0.75 to 1. When operating said operation lever 8 rotates centering around the fulcrum 11, the coupling plate 4 is moved in the up and down direction, the operation lever 8 rotates centering around the fulcrum 11. The coupling plate 4 is moved up and down and the curving direction of the wind direction adjusting plate 2 is changed.

At the lower portion of said operation lever 8, a rod 6 is provided parallel to the operation lever 8, one end of which is rotatably supported at the coupling plate 4 while the other end is supported on the main body case 1 at the position corresponding to the fulcrum 11 of the operation lever 8. In accordance with the movement of the operation lever 8, said rod 6 rotates parallel to the operation lever 8 and upwardly or downwardly, thereby assists four pieces of the wind direction adjusting plates 2 to draw a smooth arc securely.

With regard to the grille for air conditioning constituted as described in the above, the operation will be explained and the effects are mentioned.

First, as shown in FIG. 6, when the operation lever 8 which is provided at the left side of the front portion of the main body case 1 is in almost horizontal state, the wind direction adjusting plate 2 is also in the horizontal state which is a free or natural length.

Next, when the operation lever 8 is operated upwardly, said operation lever 8 rotates centering around the fulcrum 11 and the point of application 9 moves downwardly and the coupling plate 4 which is coupled with the point of application 9 also moves downwardly. Accordingly, the wind direction adjusting plate 2 is curved downwardly since the other side 17 of the wind direction adjusting plate 2 is coupled and fixed on the coupling plate 4 and the wind is sent from the rear of the main body case 1. In this case, the radius of curvature L2 at the natural length between the point of application 9 and the fulcrum 11 of the operation lever 8 is smaller than the span L1 at the natural length between the two sides 3 and 17 of the wind direction adjusting plate 2 becomes gradually small while the degree of curvature of the wind direction adjusting plate 2 becomes large. In this case, as mentioned in the above, the ratio of the radius of curvature L2 at the natural length between the two points 9 and 11 of the operation lever 8 to the span L1 at the natural length between the two sides 3 and 17 of the wind direction adjusting plate 2 is about 0.75 to 1. Accordingly, the end portion of the other side 17 of the wind direction adjusting plate 2 (horizontal direction) coming from the rear of the main body case 1 without regarding to the state of curvature of the wind direction adjusting plate 2. In this case, since the other side 17 does not effect any rotational force on the shaft 27, the other side 17 can be fixed to the shaft 27. Accordingly, the ratio of the radius of curvature L2 of the operation lever 8 to the span L1 of the wind direction adjusting plate 2 is optimally about 0.75 to 1. As a result, the wind 102 in the horizontal direction from the rear of the main body case 1 flows along the upper surface of the wind direction adjusting plate 2, gradually changes its direction upwardly according to the curved portion and blows out of the front end portion of the main body case 1.

Next, when the operation lever 8 is operated downwardly, the point of application 9 of the operation lever 8 moves upwardly centering around the fulcrum 11 and the coupling plate 4 which is coupled with the point of application 9 also moves upwardly. Since the wind direction adjusting plate 2 is coupled with the coupling plate 4 at the other side 17 as described in the above, the wind direction adjusting plate 2 curves upwardly. In this case, the end portion of the wind direction adjusting plate 2 at the other side 17 is in the same direction as the one of the wind 102 (horizontal direction) coming from the rear of the main body case 1. Therefore, the wind 102 in the horizontal direction coming from the rear of the main body case 1 flows along the under surface of the wind direction adjusting plate 2, gradually changes its direction downwardly according to the curved portion and blows out of the front end portion of the main body case 1.

As described in the above, the grille for air conditioning in the present embodiment is simple in constitution. The wind direction adjusting plate 2 can draw a smooth arc reliably by the operation of the operation lever 8. Moreover, since the end portion of the wind direction adjusting plate 2 at the other side 17 is in the same direction with the one of the wind 102 coming from the rear of the main body case 1, the wind 102 flows smoothly along the wind direction adjusting plate 2 and a noise is hardly generated, even when a strong wind 102 blows out.

Figure 7:
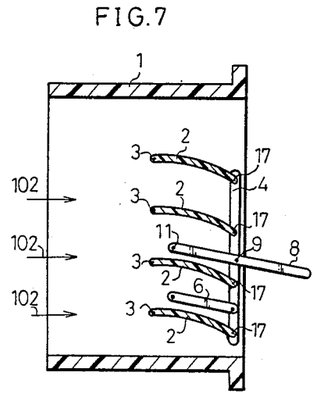
FIG. 7 is a longitudinal view of a grille for air conditioning.

In the above third embodiment, the present invention may be embodied as follows:

(1) The grille for air conditioning according to the present invention may be constituted as shown in FIG. 7, one side 3 of the wind direction adjusting plate 2 is placed at the rear portion in the main body case 1 and the coupling plate 4 at the front portion in the main body case 1. The operation lever 8 is coupled with the fulcrum 11 disposed at the rear portion of the main body case 1 and the point of application 9 of the coupling plate disposed at the front portion. Also, the rod 6 is provided parallel to said operation lever 8. The principle of operation of the grille for air conditioning thus constituted in the same as the foregoing embodiment.

Moreover, the ratio of the radius of curvature L2 of the two points 9 and 11 of the operation lever 8 and the radius of curvature L2 of the two points of the rod 6 to the span L1 in the natural length between the two sides 3 and 17 is 0.75 to 1.

In the grille for air conditioning thus constituted, as described in the foregoing embodiment, when the operation lever 8 placed on the left side of the front portion of the main body case 1 is in the almost horizontal state, the wind direction adjusting plate 2 is also in the horizontal state, and has a natural length.

Next, when the operation lever 8 is operated upwardly, the point of application 9 moves upwardly centering around the fulcrum 11. At the same time, the coupling plate 4 also moves upwardly while the wind direction adjusting plate 2 curves downwardly. Accordingly, the wind 102 coming from the rear of the main body case 1 flows along the upper surface of the wind direction adjusting plate 2, smoothly changes the direction upwardly and blows out of the front end portion of the main body case 1.

On the contrary to the above, when the operation lever 8 is operated downwardly, the point of application 9 moves downwardly, simultaneously the coupling plate 4 also moves downwardly and the wind direction adjusting plate 2 curves upwardly (as shown in FIG. 7). Accordingly, the wind 102 coming from the rear portion in the main body case 1 flows along the under surface of the wind direction adjusting plate 2, smoothly changes its direction downwardly and blows out of the front end portion of the main body case 1.

As a result, a noise accompanied by blowing out of the wind 102 is hardly generated as in the foregoing embodiment.

(2) In the embodiment described above, the wind direction adjusting plate 2 is disposed in the horizontal direction so as to adjust the direction of the wind 102 in the vertical direction, but the wind direction adjusting plate 2 may be disposed in the vertical direction so as to adjust the direction of the wind in the longitudinal direction. Also, these two kinds of the wind direction adjusting plate 2 may be provided together in the one main body case 1.

Namely, the wind direction adjusting plates 2 may be disposed in the horizontal direction at the front portion of the main body case 1 and in the vertical direction at the rear portion. On the contrary to that, they may be disposed in the vertical direction at the front portion and in the horizontal direction at the rear portion.

(3) In the foregoing embodiment, the grille for air conditioning according to the present invention is embodied on the instrument panel of an automobile but may be embodied on heaters for home use or air conditioners and others.

(4) The two points 9 and 11 of the operation lever 8 and the two points of the rod 6 may be positioned ahead compared with the case of the foregoing embodiment.

Figure 8:
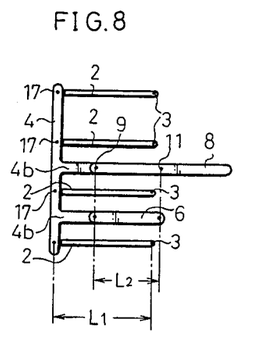
FIG. 8 is a side view showing an internal structure of a grille for air conditioning.

As shown in FIG. 8, for example, the fulcrum 11 of the operation lever 8 and the point of support of the rod 6 are positioned a little ahead of the one side 3 of the wind direction adjusting plate 2. Moreover, the fulcrum 11 of the operation lever 8 and the point of support of the rod 6 may be positioned ahead of the other side 17 of the wind direction adjusting plate 2. In this case, the coupling plate 4 is provided with projections 4b at the two up and down positions, which are rotatably coupled respectively with the fulcrum 11 of the operation lever 8 and the point of support of the rod 6.

[FOURTH EMBODIMENT]

An overall constitution of a grille for air conditioning according to the present embodiment is the same as the foregoing third embodiment except a part. Accordingly, the main different points from the foregoing third embodiment will be explained hereafter.

First, a wind direction adjusting plate 2 is a soft material 100 easy to be curved. As soft materials 100, olefin resin such as polypropylene and others, polyvinylchloride resin, urethane resin and others or elastic materials such as solid rubber, sponge rubber and others are used.

Figure 9:
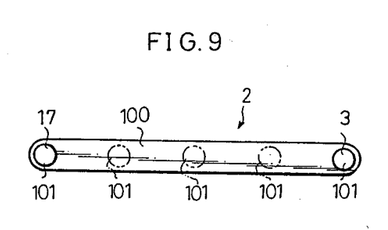
FIG. 9 is a side view of a wind direction adjusting plate.
Figure 10:
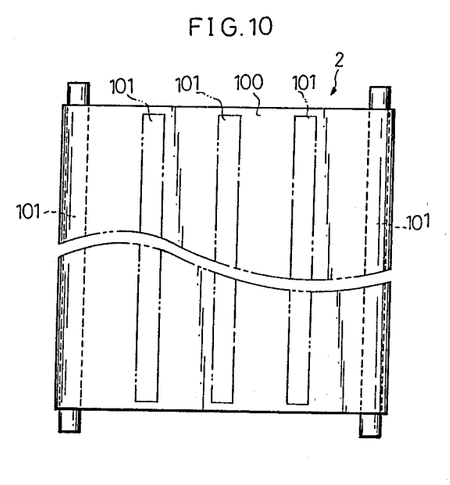
FIG. 10 is a plan view showing a wind direction adjusting plate.

As shown, in FIG. 9 and FIG. 10, the two sides 3, 17 at two ends of the wind direction adjusting plate 2 are constituted with a rigid material 101. As said rigid materials 101, metal such as aluminum and others, hard resin such as hard polyvinylchloride resin or hard rubber and so on are used. Said rigid material 101 is inserted to said soft material 100 being molded in the fixed configuration or insert molded to manufacture the wind direction adjusting plate 2. In this case, insert molding is suitable from the point of easy manufacture. Said rigid material 101 can prevent the distortion of the wind direction adjusting plate 2 and exhibits enough rigidity in the horizontal direction (direction which rigid material exists) of the wind direction adjusting plate 2.

Moreover, in addition to said two sides 3 and 17, said rigid material 101 may be disposed at the positions as desired and in the number as desired (in FIGS. 9 and 10, 3 positions at equal intervals) between the two sides 3 and 17 of the wind direction adjusting plate 2. By increasing the number of the rigid materials 101 as mentioned above, the effects described in the above is increased.

The operation of the grille for air conditioning thus constituted will be explained and its effects are mentioned hereafter.

First, when the operation lever 8 disposed at the left side of the front portion of the main body case 1 is in a substantially horizontal state, the wind direction adjusting plate 2 is also in the same horizontal state and has a natural length.

Next, when the operation lever 8 is operated upwardly, the operation lever 8 rotates, as shown in FIG. 6, centering around fulcrum 11. The point of application 9 moves downwardly and the coupling plate 4 also moves downwardly, since it is coupled with the point of application 9. Accordingly, the wind direction adjusting plate 2 curves downwardly, since the other side 17 is coupled with and fixed on the coupling plate and the wind 102 is sent from the rear of the main body case 1. In this case, the wind direction adjusting plate 2 is formed of a soft material 100, therefore easily curves downwards. On the other hand, the two sides 3 and 17 are formed of a rigid material 101, therefore the wind direction adjusting plate 2 possesses enough rigidity longitudinally (direction which rigid material is disposed) and the whole is hard to be twisted. Also, the fulcrum 11 of the operation lever 8 is positioned behind the one side 3 of the wind direction adjusting plate 2 and the distance between the point of application 9 and the fulcrum 11 of the operation lever 8 is shorter than the distance between the two sides 3 and 17 of the wind direction adjusting plate 2. Therefore, as the coupling plate 4 moves downwardly, the straight line between the two sides 3 and 17 of the wind direction adjusting plate 2 gradually becomes short while the degree of curvature of the wind direction adjusting plate 2 becomes big. In this case, the wind direction adjusting plate 2 easily follows the degree of its curvature and the whole of the wind direction adjusting plate 2 is hard to be twisted.

Moreover, the ratio of the radius of curvature L2 in the natural length (horizontal direction) between the point of application 9 and the fulcrum 11 of the operation lever 8 to the span L1 in the natural length (horizontal direction) between the two sides 3 and 17 of the wind direction adjusting plate 2 is set at 0.75 to 1. Therefore, the end portion of the other side 17 is in the same direction as the one of the wind 102 (horizontal direction) coming from the rear of the main body case 1, without regarding to the state of curvature of the wind direction adjusting plate 2. As a result, the wind 102 in the horizontal direction coming from the rear of the main body case 1 flows along the upper surface of the wind direction adjusting plate 2, gradually changes its direction upwardly according to the curved portion and blows out of the front end portion of the main body case 1.

On the contrary to the above, when the operation lever 8 is operated downwardly, the point of application 9 of the operation lever 8 moves upwardly centering around the fulcrum 11 and the coupling plate also moves upwardly, since it is coupled with it. And the wind direction adjusting plate 2 curves upwardly, since it is coupled with the coupling plate 4 at the other side 17 as mentioned in the above. In this case, as mentioned in the above, the wind direction adjusting plate 2 is formed of a soft material 100, therefore it easily curves upwardly. Moreover, the two sides 3 and 17 are formed of a rigid material 101, therefore the wind direction adjusting plate 2 possesses enough rigidity longitudinally, resulting in the whole of the plate 2 is hard to be twisted. Also, as mentioned in the above, the end portion at the other side 17 of the wind direction adjusting plate 2 is in the same direction as the one of the wind 102 (horizontal direction) coming from the rear of the main body case 1.

Therefore, the wind 102 in the horizontal direction coming from the rear of the main body case 1 flows along the under surface of the wind direction adjusting plate 2, gradually changes its direction downwardly according to the curved portion and blows out of the front end of the main body case 1.

As described in the above, the grille for air conditioning in the present embodiment can transfer the force almost uniformly over the whole of the wind direction adjusting plate 2 by the operation of the operation lever 8. Therefore, the wind direction adjusting plate 2 is not twisted and is curved easily in the desired direction. Accordingly, the wind 102 coming from the rear of the main body case 1 flows smoothly along the wind direction adjusting plate 2, generates no noise and maintains favorable wind direction.

Figure 11:
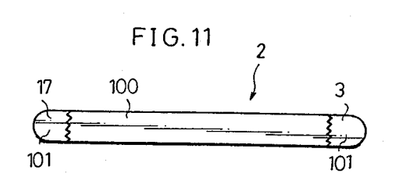
FIGS. 11 and 12 are side views showing a wind direction adjusting plate.

The realization of the present invention is not limited to the fourth embodiment described in the above but modified in various ways as follows:

In the wind direction adjusting plate 2, a rigid material 101 may be disposed in the following way besides the foregoing embodiment. As shown in FIG. 11, the two sides 3 and 17 of the wind direction adjusting plate 2 and thereabouts may be formed in waves and with hard resin such as hard polyvinylchloride for rigid material 101 portion while with soft resin such as soft polyvinylchloride for other soft material 100 portion. Also, they may be formed with hard rubber of Shore A hardness 80 or thereabout for said rigid material 101 portion while with low hardness rubber of Shore A hardness 30 or thereabout or sponge rubber for other soft material 100 portion.

Figure 12:
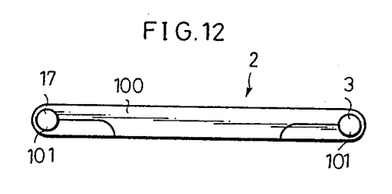

Moreover, as shown in FIG. 12, the soft material 100 portion may be previously formed, then the two sides 3 and 17 formed with rigid material 101 may be involved such as to form the wind direction adjusting plate 2.

[FIFTH EMBODIMENT]

An other embodiment embodying the present invention will be explained hereafter with reference to FIG. 14 and FIG. 15.

A grille for air conditioning 31 according to the present embodiment is adapted to send the wind 102 from the rear to the front. Also, the direction of the wind is adapted to be changed laterally to the desired angle by operating an operation lever 8 laterally.

Figure 14:
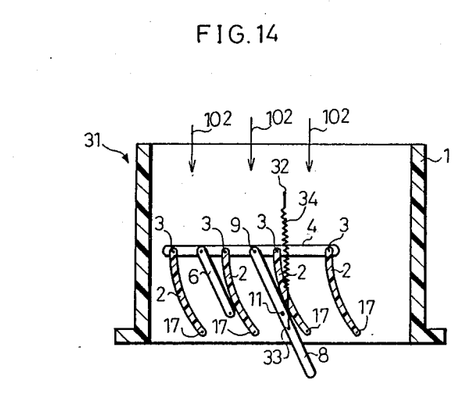
FIGS. 14 and 15 are transverse sectional views showing a grille for air conditioning.
Figure 15:
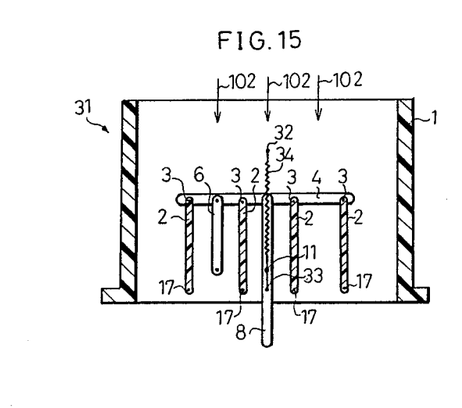

As shown in FIG. 14, four pieces of wind direction adjusting plates 2 being curvable in a shape of an arc are disposed in the main body case 1, one end of which is rotatably supported in the main body case 1 at the front one side 3. The other end of the wind direction adjusting plate 2 is coupled with a coupling plate 4 which couples four pieces of the wind direction adjusting plate 2. At the substantially central portion of said coupling plate 4, one end of said operation lever 8 is coupled at the point of application 9. Also, the substantially central portion of said operation lever 8 is supported on the main body case 1 at the fulcrum 11. Accordingly, when the front end of the operation lever 8 which is outside of the main body case 1 is operated, the operation lever 8 rotates centering around the fulcrum 11 so as to move the coupling plate 4 in the lateral direction.

At the left side of said operation lever 8, a rod 6 is disposed with its one end is coupled with said coupling plate 4 and the other end is rotatably supported on the main body case 1. And said operation lever 8, coupling plate 4 and said rod constitute a parallel link. When said operation lever 8 is moved in the lateral direction, said coupling plate 4 moves laterally through the parallel link. The four pieces of wind direction adjusting plates 2 are adapted to be curved in a shape of an arc in the desired direction.

Moreover, near the center of the main body case 1, a spring 34 as a resilient member is provided. One end 32 of said spring 34 is fixed on the main body case 1 as the portion of being behind said coupling plate 4 and as shown in FIG. 15, being on the extention line of the operation lever 8 when the wind direction adjusting plate 2 has a natural length while the other end 33 is fixed ahead of the fulcrum 11 of the operation lever 8.

The ratio of the radius of curvature of the operation lever 8 in the natural length between the two points 9 and 11 to the span in the natural length between the two sides 3 and 17 of the wind direction adjusting plate 2 is preferably 0.65–0.85 to 1 and optimally about 0.75 to 1.

The operation of the grille for air conditioning constituted as described in the above is explained and the effects are mentioned.

As shown in FIG. 14, when the front end of the operation lever 8 is moved to the right from the front side of the main body case 1, said operation lever 8 rotates centering around the fulcrum 11. Therefore, the coupling plate 4 which is coupled with the other end of the operation lever 8 moves to the left on the contrary. At the same time, the four pieces of wind direction adjusting plates 2 are curved in a shape of an arc in cooperation with movement of the coupling plate 4, since the other sides 17 are rotatably supported. In this case, the curved wind direction adjusting plates 2 effect a restoring force on the coupling plate 4. This force becomes a moment to rotate to the right the operation lever 8 around the fulcrum 11.

On the other hand, said spring 34 pulls the other end 33 on the operation lever 8 with the one end portion 32 as a base point toward the end portion 32. Accordingly, said pulling force becomes a moment to rotate to the left the operation lever 8 around the fulcrum 11.

Therefore, said both moments act with each other in the opposite direction to balance. Accordingly, the state of curvature of the wind direction adjusting plate 2 is not restored.

Moreover, the operation lever 8 can be operated within the extent of the frictional force at the other side 17 of the wind direction adjusting plate 2, the fulcrum 11 of the operation lever 8 and so on. Therefore, even when the degree of curvature of the wind direction adjusting plate 2 becomes big, the operation of the operation lever 8 is light.

When the state of curvature of the wind direction adjusting plate 2 is small, the length of a perpendicular line from the fulcrum 11 of the operation lever 8 to the wind direction adjusting plate 2 (corresponding to the distance from the rotational center of the moment) is small but the length of the spring 34 is long and the spring force is big, therefore resulting in a balance.

When the state of curvature of the wind direction adjusting plate 2 is big, the force of the wind direction adjusting plate 2 to return to the original state becomes big. But the moment in the reverse direction by the the spring 34 becomes big because the length from the rotation center of the moment becomes long, resulting finally in a balance.

On the contrary to the above, when the operation lever 8 is moved to the left, the wind direction adjusting plate 2 curves the other way and the moment is in the reverse direction. But the moment of the spring 34 for the operation lever 8 is also in the reverse direction, resulting in a balance between them. As shown in FIG. 15, when the wind direction adjusting plate 2 is in the position of a natural length, the wind direction adjusting plate 2 effects no force on the coupling plate 4. Accordingly, the spring 34 needs to effect no moment on that.

As described in the above, in the grille for air conditioning according to the present embodiment, the operation force of the operation lever 8 is light without regarding to the position of operation by the operation lever 8. Also, the state of curvature of the wind direction adjusting plate 2 is not returned to the original state without regarding the degree of curvature of the wind direction adjusting plate 2.

Moreover, when the ratio of radius of curvature of said operation lever 8 to the span of the wind direction adjusting plate 2 is set at 0.75 to 1, the one side 3 of the wind direction adjusting plate 2 is always in the same direction as the one of the wind 102 coming from the rear of the main body case 1 and since the one side 3 effects no rotational force on the coupling plate 4, the one side 3 can be fixed on the coupling plate 4.

[SIXTH EMBODIMENT]

In the present embodiment, excepting the fixing position of the spring 34, the others are the same as the fifth embodiment described in the above.

Figure 16:
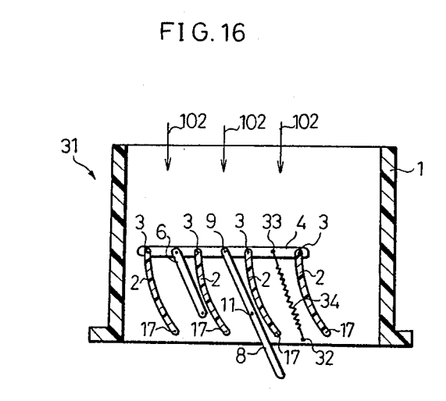
FIG. 16 is a transverse sectional view showing the curved state of a wind direction adjusting plate of a grille for air conditioning and FIG. 17 is a transverse sectional view showing a not-curved state of a wind direction adjusting plate.
Figure 17:
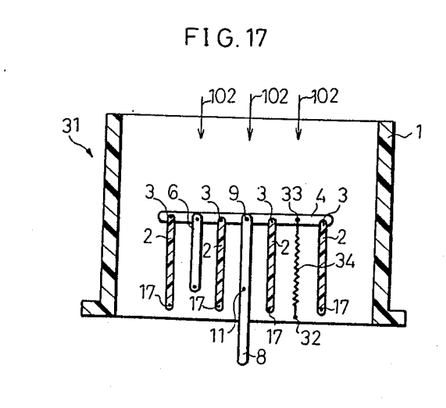

As shown in FIG. 16, one end 32 of a spring 34 is fixed on the main body case 1 ahead of the fulcrum 11. The other end portion 33 is fixed on the coupling plate 4 and, as shown in FIG. 17, when the wind direction adjusting plate 2 is in the natural length, the other end 33 is in the same direction as the wind direction adjusting plate 2.

Next, the operation of the grille for air conditioning according to the present invention is explained and its effects are mentioned.

As shown in FIG. 16, when the front end portion of the operation lever 8 is moved to the right, the coupling plate 4 moves to the left in the same way as the third embodiment described in the above. At the same time, four pieces of wind direction adjusting plate 2 is curved in a shape of an arc. In this case, the curved wind direction adjusting plate 2 effects a restoring force on the coupling plate 4. Therefore, this force becomes a force to press the coupling plate 4 backwards. As the degree of curvature of the wind direction adjusting plate 2 increases, said pressing force increases in a straight line.

On the other hand, the spring 34 pulls the other end 33 which is on the coupling plate 4 toward the one end 32 with it as a base point.

Accordingly, a combined force of said pressing force to press backwards by the wind direction adjusting plate 2 with said pulling force to pull the coupling plate 4 forwards by the spring 34 effects the coupling plate 4. Said combined force is within the extent of the frictional force of the one side 3 of the wind direction adjusting plate 2, the fulcrum 11 of the operation lever 8 and so on, during the time when the degree of curvature of the wind direction adjusting plate 2 becomes considerably big compared with the case of being no such the spring 34.

Therefore, the state of curvature of the wind direction adjusting plate 2 is not restored to the original state owing to said frictional force and the operation of the operation lever 8 is light.

On the contrary, when the operation lever 8 is moved to the left, the wind direction adjusting plate 2 curves in the reverse direction but the spring force of the wind direction adjusting plate 2 on the coupling plate 4 is backwards as well. On the other hand, the pulling force of the spring 34 is forwards as well. Therefore, the combined force of the two is within the extent of the frictional force. Moreover, as shown in FIG. 17, when the wind direction adjusting plate 2 is in the position of a natural length, said wind direction adjusting plate 2 effects no force on the coupling plate 4. On the other hand, the spring 34 effects a pulling force forwards on the coupling plate 4 but since the operation lever 8 sustains the pulling force, the wind direction adjusting plate 2 is not curved.

As described in the above, in the grille for air conditioning according to the present embodiment, the combined force is almost within the extent of the frictional force, without regarding the position of the operation lever 8 and the operation force is light. Also, the state of curvature of the wind direction adjusting plate 2 is not restored to the original state, without regarding the degree of curvature of the wind direction adjusting plate 2.

Moreover, in the present embodiment, the position on which the other end 33 of the spring 34 is fixed may be any one of the operation lever 8, the coupling plate 4 or the rod 6 consituting a parallel link.

The embodiment of the present invention is not limited to the sixth embodiment described above but may be modified in various ways as follows:

(1) In the foregoing fifth and sixth embodiments, the spring 34 is disposed so as to pull the coupling plate 4 by the spring 34 force from the rear to the front. Instead of this, the spring 34 may be disposed behind the coupling plate 4 so as to press the coupling plate 4 by the spring 34 force from the rear to the front. In other words, the one end 32 of the spring 34 is fixed behind the coupling plate 4 in the main body case 1 while the other end 33 is fixed on the coupling plate 4 in a state of the spring 34 being compressed.

Being thus constituted, when the wind direction adjusting plate 2 is curved, the combined force of the backward force of the wind direction adjusting plate 2 with the foreward force of the spring 34 is within the extent of the frictional force of the grille for air conditioning described above. Therefore, the same operation and effects as in the sixth embodiment are obtained.

(2) In the fifth and sixth embodiments described in the above, the wind direction adjusting plate 2 is disposed in the vertical direction but may be disposed in the horizontal direction. In this case, a parallel link constituting of the operation lever 8, the coupling plate 4 and the rod 6 as well as the spring 34 are positioned in the same way as in the foregoing embodiments. Thereby, the same operation and effects in the foregoing embodiments are obtained.

(3) In the foregoing fifth and sixth embodiments, the operation lever 8 is positioned besides the rod 6 but by extending the rod 6, the rod 6 may be used as the operation lever. Instead of the operation lever 8 and the rod 6, the operation lever for exclusive use may be provided.

[SEVENTH EMBODIMENT]

The constitution of the grille for air conditioning according to the present embodiment is the same as in the foregoing first embodiment except for a part. Accordingly, the different points from the first embodiment are explained hereafter.

Figure 21:
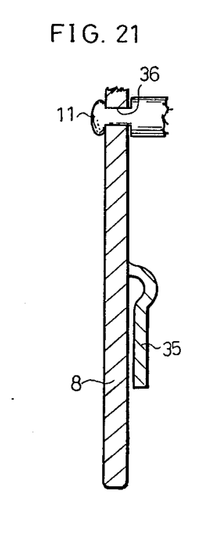
FIG. 21 is a sectional view showing an operation lever attached with a projection.

As shown in FIG. 21, a projection 35 which is resiliently deformable in the vertical direction and used for engagement as an engaging portion is fixed on the upper surface (right side of FIG. 21) of the operation lever 8. Moreover, a shaft is inserted into a hole 36 bored in the operation lever 8 to be used as a fulcrum 11.

Figure 20:
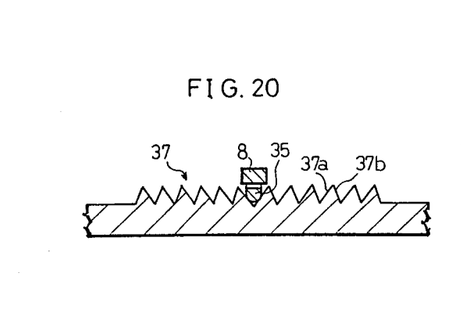
FIG. 20 is a sectional view taken along XX—XX of FIG. 19.

On the other hand, as shown in FIG. 20, at the center of the front end portion of the bottom surface in the main body case 1, an engagement member 37 with an irregular upper surface which is shaped a triangle section and in a shape of an arc corresponding to the rotation locus of the projection 35 fixed on the under surface of the operation lever 8 is secured. The shape of triangles at the section on the upper surface of said engagement member 37 is an easy inclined plane 37a toward both ends from the centers and a steep inclined plane 37b toward the center from both sides. Accordingly, the projection 35 of said operation lever 8 can smoothly move on the engagement member 37 from the center toward both sides while it can be stopped at the desired position on the way from the ends toward the center. The shape of the upper surface of the engagement member 37 may be the shape of a trapezoidal cross section and others besides the shape of a triangular cross section, if it has an easy inclined plane 37a and a steep inclined plane 37b.

The operation of the grille for air conditioning thus constituted is explained and its effects are mentioned.

Figure 18:
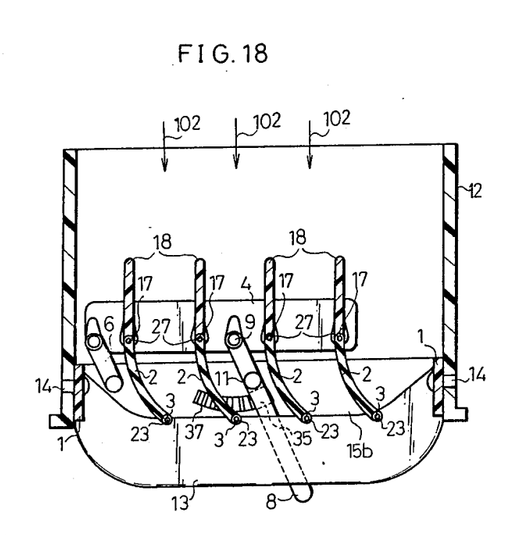
FIG. 18 is a transverse sectional view showing a curved state of a wind direction adjusting plate of a grille for air conditioning.
Figure 19:
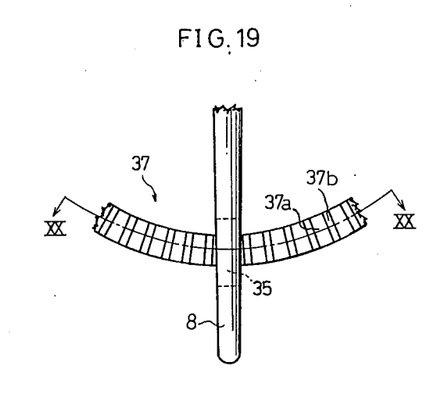
FIG. 19 is a plan view showing an engaging state of a projection with an engaging member.

As shown in FIG. 18, when the front end of the operation lever 8 is moved to the right from the front side out of main body case 1, said operation lever 8 rotates centering around the fulcrum 11. Thereby, the coupling plate 4 moves to the left on the contrary, since the coupling plate 4 is coupled with the other end of the operation lever 8. In this case, the projection 35 provided on the under surface of the operation lever 8 smoothly moves from the central position on the engagement member 37 toward the right direction on the easy inclined plane 37a with a little up and down movement in opposition to the urging force of the resilient projection 35 on the operation lever 8. Accordingly, the feeling of operation is favorable.

At the same time, four pieces of wind direction adjusting plates 2 curve in a shape of an arc in accordance with the movement of the coupling plate 4, since the one ends 3 are rotatably supported. In this case, the curved wind direction adjusting plate 2 effects a restoring force on the coupling plate 4. But, the projection 35 of said operation lever 8 is engaged with the steep inclined plane 37b at the position of the engagement member 37 shown in FIG. 18, therefore the operation lever 38 is retained at that position. Also, since the projection 35 of the operation lever 8 is resilient, said projection 35 and the engagement member 37 are more securely engaged.

Accordingly, the coupling plate 4 which is coupled with the point of application 9 of the operation lever 8 is also retained in that position, thereby the wind direction adjusting plate 2, the other end of which is coupled with the coupling plate 4, is retained in that position in the state of specified curvature.

On the contrary to the above, when the operation lever 8 is moved in the left direction, the coupling plate 4 moves to the right, the wind direction adjusting plate 2 curves in the reverse direction and presses the coupling plate 4 backward. In this case, the projection 35 fixed on the under surface of the operation lever 8 is also engaged with the steep inclined plane 37b of the engagement member 37, thereby the state of curvature of the wind direction adjusting plate 2 is retained. Moreover, when the wind direction adjusting plate 2 is in the position of a natural length, said wind direction adjusting plate 2 effects no force on the coupling plate 4. Accordingly, as shown in FIG. 20, even when the projection 35 of the operation lever 8 is in the position between the easy inclined planes 37a at the center on the engagement member 37, the operation lever 8 is not moved.

In the grille for air conditioning of the present embodiment, as described in the above, the state of curvature of the wind direction adjusting plate 2 is not restored to the original state without regard to the degree of its curvature, owing to the engagement of the projection 35 fixed on the under surface of the operation lever 8 with the engagement member 37 and the frictional force at the fulcrum 11, the point of application 9, the shaft 27 and others. Accordingly, the position of operation by the operation lever 8 may be resiliently set at the desired position.

Moreover, the shape of the upper surface of the engagement member 37 is a triangle at its cross section with an easy inclined plane 37a and a steep incline plane 37b. Therefore, the operation lever 8 moves smoothly on the easy inclined plane 37a from the central portion toward the both ends.

The embodiment of the present invention is not limited to the seventh embodiment described in the above but may be modified in various ways as follows:

(1) In the present embodiment, the position of fixing the projection 35 may be any one of the operation lever 8, the coupling plate 4 and the rod 6 constituting a parallel link. The position of fixing the engagement member 37 may be the position corresponding to the projection 35 on the main body case 1 or the wind blowing duct 12.

(2) The magnet may be used for the projection 35 and the engagement member 37 to engage with each other. In this case, it is necessary to increase the magnetic force at the both ends of the engagement member 37 where the state of curvature of the wind direction adjusting plate 2 becomes big.

(3) In the foregoing seventh embodiment, the wind direction adjusting plate 2 is disposed in the vertical direction but may be disposed in the horizontal direction. In this case, a parallel link constituted of the operation lever 8, the coupling plate 4 and the rod 6 as well as the projection 35 and the engagement member 37 are disposed in the same positioning relationship as in the foregoing seventh embodiment, thereby the same operation and effects as in the foregoing seventh embodiment are obtained.

(4) Instead of the operation lever 8 in the foregoing seventh embodiment, the rod 6 may be extended to use as the operation lever. Also, an operation lever for exclusive use may be provided besides the operation lever 8 and the rod 6.

(5) In the foregoing seventh embodiment, one projection 35 is provided on the operation lever 8 and the engagement member 37 having a multiplicity of irregularities is provided on the main body case 1. Instead, a multiplicity of projections 35 may be provided on the operation lever 8 and an engagement member 37 having one convex portion may be provided.

(6) As a means to retain the operation lever at the designated position, a worm gear device comprising a worm wheel and a worm may be used. By the action of the worm gear device, the position of the operation lever 8 is retained and also the state of curvature of the wind direction adjusting plate 2 is retained.

As many apparently widely different embodiments of this invention may be made without departing from the spirit and scope thereof, it is to be understood that the invention is not limited to the specific embodiments thereof except as defined in the appended claims.

What is claimed is:

1. A grille for air conditioning comprising:
a main body case having an opening for the blowing out a wind,
a plurality of curvable wind direction adjusting plates supported so as to be rotatable relative to said main body case, each said wind direction adjusting plate having a proximal edge located at a downstream side of the wind and a distal edge located at an upstream side of the wind, both said edges extending in a substantially intersecting direction with a blowing direction of the wind,
a support member supporting said distal edges of said wind direction adjusting plates, said support member having extension plates respectively extending along an extending plane of said distal edge of each said wind direction adjusting plate and coupling plates coupling said extension plates with each other,
moving means means for said support member on a circular locus relative to said main case, said arc having a shorter radius of curvature than a span between said two edges of said wind direction adjusting plate in an unstressed configuration.

2. A grille for air conditioning according to claim 1, wherein a ratio of said radius of curvature to said span is 0.65–0.85 to 1.

3. A grille for air conditioning according to claim 2, wherein a ratio of said radius of curvature to said span is about 0.75 to 1.

4. A grille for air conditioning according to claim 1, wherein said moving means includes a rod, one end of which is coupled with said support member and the other end of which is coupled with said main body case, said rod constituting a parallel link with said main body case and said support member, and said radius of curvature is defined by a distance between both ends of said rod.

5. A grille for air conditioning according to claim 4, wherein said moving means include operation means extending from an end portion of said rod positioned at a downstream side of the wind and formed integrally with said rod.

6. A grille for air conditioning according to claim 1, wherein the distal edge of each of each said wind direction adjusting plate positioned at an upstream side of the wind is fixed so as to be in parallel with the blowing direction of the wind.

7. A grille for air conditioning according to claim 1, wherein said coupling plates support said distal edges at intersections with said distal edges.

8. A grille for air conditioning according to claim 1, wherein said extension plates support said distal edges at least at one portion, respectively.

9. A grille for air conditioning according to claim 1, wherein said main body case includes a plurality of second wind direction adjusting plates extending in substantially an intersecting direction with said wind direction adjusting plates and positioned at the downstream side of said wind direction adjusting plates.

10. A grille for air conditioning according to claim 9, wherein said second wind adjusting plate is rigid and said main body case is supported on a duct rotatably around a shaft parallel with said rigid second wind direction adjusting plate.

11. A grille for air conditioning according to claim 10, wherein said moving means include a plurality of rods, one end of which is coupled with said coupling plate and the other end of which is coupled with said second wind direction adjusting plates of said main body case, each said rod constituting a parallel link mechanism with said main body case and said support member, and said radius of curvature is defined by a distance between both ends of said rod.

12. A grille for air conditioning according to claim 11, further including an operation rod which is supported rotatably on said second wind direction adjusting plate, one end of said operation rod projecting from a down stream side of said second wind direction adjusting plate to define an operation portion while the other end of said operation rod being coupled with said coupling plate, said support member being movable by operating said operation portion.

13. A grille for air conditioning according to claim 12, wherein said operation rod is mounted on said second wind direction adjusting plate in a state of pressing contact and generates between them a frictional force to retain a state of curvature of said wind direction adjusting plate in opposition to a resilient restoring force of said wind direction adjusting plate.

14. A grille for air conditioning according to claim 12, wherein said coupling plates are three or more in number, said operation rod is coupled with a central coupling plate excepting outermost coupling plates.

15. A grille for air conditioning according to claim 9, wherein said second wind direction adjusting plates support said proximal edges at intersections with said proximal edges of said curvable wind direction adjusting plates.

* * * * *